United States Patent
Ren et al.

(10) Patent No.: US 12,335,339 B2
(45) Date of Patent: Jun. 17, 2025

(54) METHOD OF PREFETCHING TARGET ADDRESS, SYSTEM, DEVICE AND STORAGE MEDIA THEREOF

(71) Applicant: INSPUR SUZHOU INTELLIGENT TECHNOLOGY CO., LTD., Suzhou (CN)

(72) Inventors: Ye Ren, Suzhou (CN); Weisong Guo, Suzhou (CN); Xiang Chen, Suzhou (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/247,543

(22) PCT Filed: Nov. 30, 2021

(86) PCT No.: PCT/CN2021/134554
§ 371 (c)(1),
(2) Date: Mar. 31, 2023

(87) PCT Pub. No.: WO2022/156376
PCT Pub. Date: Jul. 28, 2022

(65) Prior Publication Data
US 2023/0403325 A1    Dec. 14, 2023

(30) Foreign Application Priority Data
Jan. 19, 2021    (CN) .......................... 202110070461.6

(51) Int. Cl.
*H04L 67/1097*    (2022.01)
*G06F 13/38*    (2006.01)
*G06F 15/173*    (2006.01)

(52) U.S. Cl.
CPC .......... *H04L 67/1097* (2013.01); *G06F 13/38* (2013.01); *G06F 15/17331* (2013.01)

(58) Field of Classification Search
CPC ......................... G06F 13/38; G06F 15/17331
(Continued)

(56) References Cited

U.S. PATENT DOCUMENTS 9,448,901 B1    9/2016    Aslam et al.
10,257,273 B2    4/2019    Govind
(Continued)

FOREIGN PATENT DOCUMENTS

CN    107636637 A    1/2018
CN    109828843 A    5/2019
(Continued)

OTHER PUBLICATIONS

International Search report for PCT/CN2021/134554 mailed on Mar. 1, 2022.
(Continued)

*Primary Examiner* — Titus Wong
(74) *Attorney, Agent, or Firm* — Dennemeyer & Associates LLC

(57) ABSTRACT

A system of prefetching a target address is applied to a server. The system includes: an Application Programming Interface (API) module, a threshold module, a control module and a first engine module, wherein the API module, the threshold module, the control module and the first engine module are all arranged in a first server; the API module acquires a Remote Direct Memory Access (RDMA) instruction in the first server; a threshold of the first engine module is set in the threshold module, and when a size of RDMA data corresponding to the RDMA instruction exceeds the threshold, the threshold module sends a thread increasing instruction to the control module; and the control module
(Continued)

controls, according to the thread increasing instruction sent by the threshold module, a network card of the first server to increase the number of threads of the first engine module.

16 Claims, 1 Drawing Sheet

(58) Field of Classification Search
USPC .......................................................... 710/33
See application file for complete search history.

(56) References Cited

U.S. PATENT DOCUMENTS

| | | | | | |
|---|---|---|---|---|---|
| 2006/0031568 | A1* | 2/2006 | Eydelman | ............... | H04L 47/39 |
| | | | | | 709/235 |
| 2008/0235409 | A1* | 9/2008 | Ryzhykh | ................. | H04L 47/30 |
| | | | | | 710/22 |
| 2011/0106905 | A1* | 5/2011 | Frey | ...................... | H04L 69/166 |
| | | | | | 709/212 |
| 2012/0096105 | A1* | 4/2012 | Oved | ...................... | G06F 9/542 |
| | | | | | 709/212 |
| 2015/0242324 | A1* | 8/2015 | Novakovic | ......... | G06F 12/0813 |
| | | | | | 711/121 |
| 2016/0226951 | A1* | 8/2016 | Talpey | .................... | G06F 3/061 |
| 2017/0017532 | A1* | 1/2017 | Falco | ...................... | G06F 9/546 |
| 2017/0075856 | A1* | 3/2017 | Suzue | ................. | H04L 67/1001 |
| 2017/0149890 | A1* | 5/2017 | Shamis | ............... | H04L 67/1097 |
| 2018/0316760 | A1* | 11/2018 | Chernin | .................. | G06F 3/067 |
| 2020/0236089 | A1* | 7/2020 | Li | ........................ | H04L 67/1097 |
| 2021/0089492 | A1* | 3/2021 | Zou | ........................ | G06F 3/0671 |

FOREIGN PATENT DOCUMENTS

| | | |
|---|---|---|
| CN | 110191194 A | 8/2019 |
| CN | 110289990 A | 9/2019 |
| CN | 111225042 A | 6/2020 |
| CN | 112765090 A | 5/2021 |

OTHER PUBLICATIONS

Search report for Chinese application 202110070461.6 filed on Jan. 19, 2021.

* cited by examiner

METHOD OF PREFETCHING TARGET ADDRESS, SYSTEM, DEVICE AND STORAGE MEDIA THEREOF

CROSS-REFERENCE TO RELATED APPLICATION

The present disclosure is a National Stage Filing of the PCT International Application No. PCT/CN2021/134554 filed on Nov. 30, 2021, which claims priority to Chinese Patent Application No. 202110070461.6, filed to the China National Intellectual Property Administration on Jan. 19, 2021 and entitled "Method and System of prefetching Target Address, and Device and Medium", the disclosure of which is hereby incorporated by reference in its entirety.

TECHNICAL FIELD

The present disclosure relates to the field of Remote Direct Memory Access (RDMA) based data transmission, in particular to a method of prefetching a target address, system, device and storage media thereof.

BACKGROUND

RDMA is a technology for directly mapping data from a user process to a network card supporting RDMA across a kernel. This method may accelerate the transmission speed of data inside a user server and may quickly transfer data into the network card. By virtue of this technology, the data does not need to be processed by a processor, so that the load of the processor is reduced and the data transmission speed is accelerated.

In the RDMA technology of the related art, when performing information transmission or acquisition, a sending end of data needs to know a target address of a user space in the other end in advance. Because RDMA is derived from a Direct Memory Access (DMA) technology of the related art, when executing the RDMA technology to perform data transmission, the target address of the other end needs to be acquired through a conventional data communication technology. In a process of using the RDMA technology to perform data transmission, a data access (i.e., read or write) address of the other end needs to be known in advance, according to the RDMA technology, the sending within the network card is implemented in a way that a series of data is sent in sequence, and therefore this mode limits the use of RDMA by a user. When executing an RDMA activity (referred to as RDMA Verbs) with a large transmission amount, the network card may not perform address acquisition of the next RDMA. Based on the above analysis, it may be concluded that address acquisition and inability to send data in parallel limit the application of the RDMA technology.

SUMMARY

Embodiments of the present disclosure provide a system of prefetching a target address, which is applied to a server. The system includes: an Application Programming Interface (API) module, a threshold module, a control module and a first engine module. The API module, the threshold module, the control module and the first engine module are all arranged in a first server.

The API module acquires an RDMA instruction in the first server.

A threshold of the first engine module is set in the threshold module, and when a size of RDMA data corresponding to the RDMA instruction exceeds the threshold, the threshold module sends a thread increasing instruction to the control module.

The control module controls, according to the thread increasing instruction sent by the threshold module, a network card of the first server to increase the number of threads of the first engine module.

In some embodiments, the first server is connected to a second server, each of the first server and the second server is provided with a memory, and the second server is provided with a second engine module.

The memory of the first server maps the RDMA data to the first engine module according to the RDMA instruction.

The first engine module sends the RDMA data to the second engine module.

The second engine module receives the RDMA data in segments according to a storage space capacity of the second engine module.

In some embodiments, the threshold module identifies a storage space capacity of the first engine module and establishes the threshold, and sends the thread increasing instruction to the control module when a size of first RDMA data currently sent or received by the first engine module and a size of second RDMA data to be sent or received by the first engine module are both greater than the threshold.

That is, when it is determined that the size of the first RDMA data currently sent or received by the first engine module and the size of the second RDMA data to be sent or received by the first engine module are both greater than the threshold, the thread increasing instruction is sent to the control module.

In some embodiments, the control module receives the instruction and sends enabling information to the network card of the first server, and the network card increases the number of threads of the first engine module according to the enabling information and sends or receives the second RDMA data.

In some embodiments, the first engine module receives the second RDMA data and maps the second RDMA data to a memory of the first server.

The embodiments of the present disclosure also provide a method of prefetching a target address, which includes the following operations.

Address presetting: address information corresponding to an RDMA instruction is preset according to the RDMA instruction in a server.

Data mapping: a memory of the server maps RDMA data corresponding to the RDMA instruction to an engine module in a network card of the server according to the RDMA instruction.

Size determining: when a size of first RDMA data currently sent or received by the engine module and a size of second RDMA data to be sent or received by the engine module are both greater than a storage space capacity of the engine module, a thread increasing instruction is sent to the network card of the server.

Thread increasing: the network card of the server increases the number of threads of the engine module.

In some embodiments, the size determining may be implemented as follows: when it is determined that the a size of first RDMA data currently sent or received by the engine module and a size of the second RDMA data to be sent or received by the engine module are both greater than the storage space capacity of the engine module, the thread increasing instruction is sent to the network card of the server.

In some embodiments, the thread increasing includes that: the increased thread of the engine module sends or receives the second RDMA data, and when the engine module receives the second RDMA data, the engine module maps the second RDMA data to the memory of the server.

In some embodiments, the size determining includes that: when the size of the first RDMA data and/or the size of the second RDMA data are/is not greater than the storage space capacity of the engine module, the engine module sends or receives the second RDMA data in sequence.

The embodiments of the present disclosure also provide a computer device, including a memory and one or more processors. Computer-readable instructions are stored in the memory. The computer-readable instructions, when executed by the one or more processors, enable the one or more processors to perform the operations of any of the methods of prefetching the target address described above. The embodiments of the present disclosure also provide one or more non-transitory computer-readable storage media storing computer-readable instructions. The computer-readable instructions, when executed by the one or more processors, enable the one or more processors to perform the operations of any of the methods of prefetching the target address described above.

Details of one or more embodiments of the present disclosure are presented in the drawings and descriptions below. Other features and advantages of the present disclosure will become apparent from the description, the drawings and the claims.

BRIEF DESCRIPTION OF THE DRAWINGS

In order to more clearly illustrate the exemplary implementations of the present disclosure or the technical solutions in the related art, the drawings used in the description of the exemplary implementations or the related art will be briefly described below. It is apparent that the drawings described below are only some implementations of the present disclosure. Other drawings may further be obtained by those having ordinary skill in the art according to these drawings without creative efforts.

DETAILED DESCRIPTION

Figure 1:
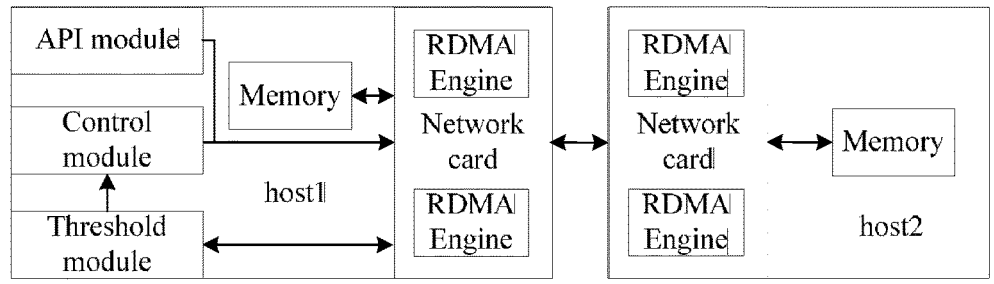
FIG. 1 is a structural topology diagram of a system of prefetching a target address according to one or more embodiments of the present disclosure.

The technical solutions of the embodiments of the present disclosure will be clearly and completely described in conjunction with the drawings. It is apparent that the described embodiments are only a part of the embodiments of the present disclosure, and not all of the embodiments of the present disclosure. All other embodiments obtained by those having ordinary skill in the art based on the embodiments in the present disclosure without creative efforts shall fall within the scope of protection of the present disclosure.

In addition, the terms "first" and "second" are used for descriptive purposes only, and cannot be understood as indicating or implying relative importance or implicitly indicating the number of indicated technical features. Therefore, the features defined with "first" and "second" may explicitly or implicitly include at least one of the features. In the description of the embodiments of the present disclosure, "plurality" means at least two, such as two, three, etc. unless otherwise specified and defined.

It is to be noted that, in the description of the embodiments of the present disclosure, for example, RDMA refers to remote direct memory access, DMA refers to direct memory access, and API refers to application programming interface.

Embodiment 1

Conventional memory access requires data copy through a Central Processing Unit (CPU) to move data, for example, Buffer1 in a memory is moved to Buffer2 in the memory by the CPU. Herein, Buffer1 and Buffer2 are different buffer areas in the memory.

A DMA mode enables movement of data from Buffer1 to Buffer2 within the same DMA Engine by hardware without the participation of the CPU of an operating system, which greatly reduces the cost consumed by CPU Copy.

RDMA is a host-offload and host-bypass technology, which allows applications (including storages) to directly perform data transmission between their memory spaces. An Ethernet card (e.g., an RDMA Network Interface Controller (RNIC)) with an RDMA engine, rather than a host, is responsible for managing a reliable connection between a source and a target, and uses dedicated Queue Pairs (QP) and a Complete Queue (CQ) to communicate between the applications, that is, data is directly mapped from a host memory into a network card having the RDMA Engine, and is directly sent to an object host also having the RDMA Engine through the network card. However, when using this technology to transmit data, an address to which data will be sent (i.e., a pointer of the data) needs to be known in advance. In the related art, the setting of the pointer is generally implemented by writing the address into an RDMA API by a developer, when the network card transmits the data, the data carrying the pointer is sent to a target object to perform a read or write operation on the target object. In this process, when RDMA acquires the pointer, a conventional memory access mode is used, that is, the acquisition of the pointer needs the participation of the CPU, for example, the CPU needs to Copy the pointer and then send the pointer into the memory, which restricts the application of the RDMA technology and limits the advantages of RDMA.

The embodiments of the present disclosure provide a system of prefetching a target address, which is applied to a server. Referring to FIG. 1, the system of prefetching the target address includes: an API module, a read function module, a write function module, a control module, an RDMA Engine and a threshold module. The API module, the read function module, the write function module, the control module, the RDMA Engine and the threshold module are all arranged in a first server (hereinafter referred to as host1), and the first server may be connected to a second server (hereinafter referred to as host2).

The RDMA Engine in host1 is a first engine module. The first engine module has a threshold due to limitations to its storage capacity. The RDMA Engine in Host2 is a second engine module.

A connection is established between host1 and host2, and host1 and host2 both have a network card supporting the RMDA technology.

Firstly, a plurality of pieces of RDMA data are cached in the memory of host1. According to the related art, the plurality of pieces of RDMA data are mapped into the RDMA Engine in the network card in sequence. A storage upper limit is set for the RDMA Engine of the network card according to a user. The threshold module is provided with a checking mechanism. When the user sends an instruction and data, the read function module and the write function module parse the instruction. The instruction carrying a corresponding address in the API module is sent to host2. In the above process, when the write function module parses a write instruction, the write function module is provided with a pointer to acquire first data to be written into host2. The threshold module checks whether second data carried by an instruction after the instruction corresponding to the first data exceeds the limit of a data cache of the RDMA Engine (i.e., the threshold of the RDMA Engine). When a size of the second data is greater than the threshold set in the threshold module, the control module controls the network card of host1 to create a new thread, the RDMA Engine of the new thread receives the next instruction and executes a command of the next instruction, the API module carries the address of the second data to the RDMA Engine of the new thread, and the RDMA Engine corresponding to the first data and the RDMA Engine of the new thread concurrently send the first data and the second data respectively. When the threshold module monitors that the size of the second data does not exceed the threshold, the control module does not control the network card of host to create the new thread. Because the bottleneck restricting the optimization for the completion time of data sending is the time required for acquiring the data by a conventional communication mode, the larger the data, the more obvious the effect. When the second data is small, the effect of creating the new thread is not so obvious, therefore the parallel processing is not performed when the size of the second data does not exceed the threshold, and a sequential execution and sending mode is still used.

Furthermore, when the instruction of host1 indicates to receive data of host2, the threshold module determines whether the size of the first data currently sent exceeds the threshold set in the threshold module and whether the size of the second data to be received exceeds the threshold set in the threshold module. When the size of the first data currently sent exceeds the threshold set in the threshold module and the size of the second data to be received does not exceed the threshold set in the threshold module, the control module does not control the network card to create the new thread, the RDMA Engine of the network card of host1 receives the second data after the RDMA Engine of the network card of host1 completes sending the first data, and the RDMA Engine of the network card of host1 maps the second data into the memory of host1.

In other words, the threshold module determines that the size of the first data currently sent exceeds the threshold set in the threshold module, and determines that the size of the second data to be received does not exceed the threshold set in the threshold module. Based on the above-mentioned determination that the size of the first data exceeds the threshold and the size of the second data does not exceed the threshold, the control module does not control the network card to create the new thread, the RDMA Engine of the network card of host1 receives the second data after completion of the sending of the first data, and the RDMA Engine maps the second data into the memory of host1.

Furthermore, when the threshold module determines that the size of the first data exceeds the threshold set in the threshold module, and determines that the size of the second data to be received also exceeds the threshold set in the threshold module, the threshold module notifies the control module, the control module controls the network card to create a new RDMA Engine, and the new RDMA Engine receives the second data, and maps the second data from the RDMA Engine into the memory of host1.

In other words, the threshold module determines that the size of the first data exceeds the threshold set in the threshold module, and determines that the size of the second data also exceeds the threshold set in the threshold module. Based on the above-mentioned determination that the size of the first data exceeds the threshold and the size of the second data also exceeds the threshold, the threshold module notifies the control module, the control module controls the network card to create the new RDMA Engine, and the new RDMA Engine receives the second data and maps the second data from the RDMA Engine into the memory of host1. Furthermore, when the threshold module determines that the size of the first data does not exceed the threshold set in the threshold module, and determines that the size of the second data to be received exceeds the threshold set in the threshold module, the control module does not control the network card to create the new thread, the RDMA Engine of the network card of host1 receives the second data after the RDMA Engine of the network card of host1 completes processing the first data.

In other words, the threshold module determines that the size of the first data does not exceed the threshold set in the threshold module, and determines that the size of the second data exceeds the threshold set in the threshold module. Based on the above-mentioned determination that the size of the first data does not exceed the threshold and the size of the second data exceeds the threshold, the control module does not control the network card to create the new thread, the RDMA Engine of the network card of host1 receives the second data after the RDMA Engine of the network card of host1 completes processing the first data.

The above-mentioned embodiment illustrates how the system determines a relationship of the size of the first data and the size of the second data with respect to the threshold, and a corresponding action made after the determination. Likewise, when the user sends a series of instructions, the control module and the threshold module only need to determine the relationship of the size of the first data being sent and the size of the second data after the first data with respect to the threshold. It is also to be noted that, limited by the performance of the control module and the threshold module, in this embodiment, the threshold module may only determine the relationship of the sizes of the two pieces of data processed in sequence with respect to the threshold. However, in some other exemplary embodiments, the threshold module may simultaneously determine the relationship of the sizes of at least two pieces of data with respect to the threshold and the control module may simultaneously control whether to create the new thread of the RDMA Engine of the network card for the at least two pieces of data. In other words, the number of pieces of data that can be concurrently processed is not limited to 2, and how to determine the relationship of the size of the data with respect to the threshold and how to perform a corresponding operation after the determination described in the embodiment may be applied to more pieces of data. The system for of prefetching the target address of the embodiment of the present disclosure may perform determination on the size of the data and create a thread according to the size of the data, and send and/or receive multiple pieces of data in parallel. For example, when big data is being processed in the RDMA Engine and the next piece of data to be received is also big data, a new thread may be created to quickly send and/or receive the multiple pieces of data.

Embodiment 2

Figure 2:
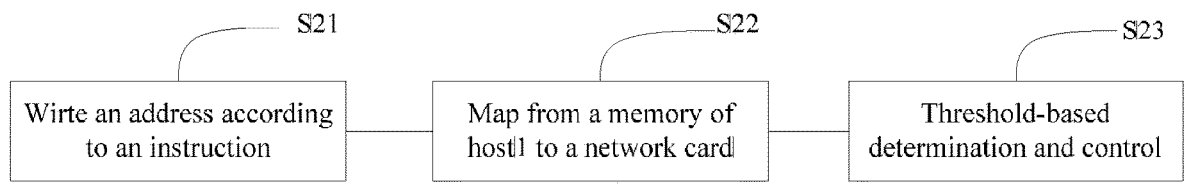
FIG. 2 is a schematic diagram of a method of prefetching a target address according to one or more embodiments of the present disclosure.

The embodiment also provides a method of prefetching a target address, referring to FIG. 2, which includes the following operations.

At S21, an address is written according to an instruction.

Firstly, a tester writes the instruction into host1. Because an RDMA technology is used, and data of the RDMA technology may be normally sent only when an address of host2 is accompanied, an address corresponding to the instruction is written into an API module, so that data corresponding to the instruction may carry address information in the API and be sent into host2.

At S22, data in a memory of host1 is mapped to a network card.

After the instruction is written, host1 starts to execute a corresponding first instruction. When the instruction is a write instruction, a write function module maps first data from the memory into an RDMA Engine of the network card of host1.

At S23, a threshold-based determination and a controlling based on the determination result are performed.

Whether a size of the first data is greater than a threshold of the RDMA Engine is determined. Because instructions are usually provided as a group, for example, in the related art, the first instruction and other instructions constitute Verbs, in which the instructions are sequential instructions, and Verbs is equivalent to an instruction set. A threshold module determines whether the size of second data corresponding to a second instruction after the first instruction exceeds the threshold. When the size of the first data exceeds the threshold and the size of the second data also exceeds the threshold, the threshold module sends an instruction to a control module so that the control module controls the network card of host1 to create a new RDMA Engine, and the new RDMA Engine receives the second data corresponding to the second instruction. With regard to host1, when receiving data or sending data, the threshold module needs to determine whether the size of the second data and the size of the first data being processed by the current network card of host1 both exceed the threshold, if so, the threshold module enables the control module, the control module sends an instruction to the network card of host1, the network card creates a new RDMA Engine, the new RDMA Engine performs data mapping, and the RDMA Engine of the network card of host1 maps the data into the memory of host1. The method for pre-fetching the target address provided in the embodiment of the present disclosure may determine the relationship of the RDMA data with respect to the threshold, perform an operation of creating the RDMA Engine in the network card according to a determination result, and map the RDMA data to the memory after the operation of creating the RDMA Engine is performed.

Embodiment 3

Figure 3:
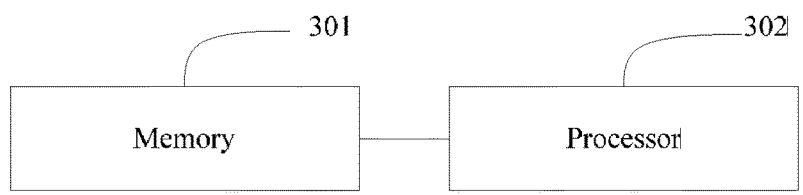
FIG. 3 is a schematic diagram of a computer device according to one or more embodiments of the present disclosure.

The embodiment of the present disclosure provides a computer device, referring to FIG. 3, which includes a memory 301 and one or more processors 302. Computer-readable instructions are stored in the memory 301. The computer-readable instructions, when executed by the one or more processors 302, enable the one or more processors 302 to perform the operations of any of the methods of prefetching the target address described above. In addition to the memory 301 and the processor 302, the computer device may further include a host adapter card, such as a network card, a Fibre Channel card, etc. configured to be connected to a third party storage system and a host server.

The computer device provided in the embodiment of the present disclosure may determine the relationship of the size of the RDMA data with respect to the threshold and create the RDMA Engine in the network card.

Based on the same application concept as the method in the above-mentioned embodiments, the embodiments of the present disclosure provide one or more non-transitory computer-readable storage media storing computer-readable instructions. The computer-readable instructions, when executed by the one or more processors, enable the one or more processors to perform the operations of any of the methods of prefetching the target address described above.

One or more non-transitory computer-readable storage media storing the computer-readable instructions provided by the embodiments of the present disclosure may create an RDMA Engine and send and/or receive RDMA data, and may compare the size of the RDMA data being processed and the size of the RDMA data needing to be processed later with a threshold, and send an instruction to a network card according to a comparison result.

The sequence numbers of the embodiments of the present disclosure are adopted not to represent superiority-inferiority of the embodiments but only for description.

Those having ordinary skill in the art should know that all or part of the operations of the above-mentioned embodiments may be implemented by hardware or related hardware instructed through a program, the program may be stored in the computer-readable medium, and the above-mentioned storage medium may be a read-only memory, a magnetic disk or a compact disc.

The above is only the embodiments of the present disclosure, and is not intended to limit the patent scope of the present disclosure. The equivalent structure or equivalent flow transformation made based on the description and the drawings of the present disclosure, or the application of the solution in the embodiments of the present disclosure directly or indirectly to other related technical fields should all be included in the scope of patent protection of the present disclosure.

What is claimed is:

1. A system of prefetching a target address, applied to a server, wherein the system comprises: an Application Programming Interface (API) module, a threshold module, a control module, a first engine module, and a write function module, wherein the API module, the threshold module, the control module and the first engine module are all arranged in a first server:

the API module acquires a Remote Direct Memory Access (RDMA) instruction in the first server:

a threshold of the first engine module is set in the threshold module, and when a size of RDMA data corresponding to the RDMA instruction exceeds the threshold, the threshold module sends a thread increasing instruction to the control module; and the control module controls, according to the thread increasing instruction sent by the threshold module, a network card of the first server to increase a number of threads of the first engine module:

wherein the threshold module identifies a storage space capacity of the first engine module and establishes the threshold, and sends the thread increasing instruction to the control module when a size of first RDMA data currently sent or received by the first engine module and a size of second RDMA data to be sent or received by the first engine module are both greater than the threshold:
wherein the control module receives the thread increasing instruction and sends enabling information to the network card, and the network card increases the number of threads of the first engine module according to the enabling information and sends or receives the second RDMA data;
wherein when the RDMA instruction comprises a first instruction which is a write instruction,
the write function module maps the first RDMA data from a memory of the first server into a first RDMA Engine, wherein the first engine module comprises the first RDMA Engine;
when the RDMA instruction also comprises a second instruction which is an instruction after the first instruction, and the second instruction indicates to receive the second RDMA data of a second server, the threshold module determines whether the size of the first RDMA data currently sent exceeds the threshold, and determines whether the size of the second RDMA data to be received does not exceed the threshold;
in a case where the threshold module determines that the size of the first RDMA data exceeds the threshold and the size of the second RDMA data does not exceed the threshold, the control module does not control the network card to create a new thread, the first RDMA Engine receives the second RDMA data after completion of the sending of the first RDMA data, and the first RDMA Engine maps the second RDMA data into the memory of the first server;
in a case where the threshold module determines that the size of the first RDMA data exceeds the threshold, and determines that the size of the second RDMA data to be received also exceeds the threshold, the threshold module notifies the control module, the control module controls the network card to create a RDMA Engine, and the new RDMA Engine receives the second RDMA data, and maps the second RDMA data into the memory of the first server.

2. The system according to claim 1, wherein the first server is connected to the second server, each of the first server and the second server is provided with a memory, and the second server is provided with a second engine module;
the memory of the first server maps the RDMA data to the first engine module according to the RDMA instruction;
the first engine module sends the RDMA data to the second engine module; and
the second engine module receives the RDMA data in segments according to a storage space capacity of the second engine module.

3. A method of prefetching a target address, comprising:
address presetting: presetting address information corresponding to a Remote Direct Memory Access (RDMA) instruction according to the RDMA instruction in a server;
data mapping: mapping, by a memory of the server, RDMA data corresponding to the RDMA instruction to an engine module in a network card of the server according to the RDMA instruction;
size determining: when a size of first RDMA data currently sent or received by the engine module and a size of second RDMA data to be sent or received by the engine module are both greater than a storage space capacity of the engine module, sending a thread increasing instruction to the network card; and
thread increasing: increasing, by the network card, a number of threads of the engine module;
wherein the thread increasing comprises: sending or receiving, by the increased thread of the engine module, the second RDMA data, and when the engine module receives the second RDMA data, mapping, by the engine module, the second RDMA data to the memory of the server,
wherein the control module receives the thread increasing instruction and sends enabling information to the network card, and the network card increases the number of threads of the first engine module according to the enabling information and sends or receives the second RDMA data;
wherein when the RDMA instruction comprises a first instruction which is a write instruction,
a write function module of a first server maps the first RDMA data from a memory of the first server into a first RDMA Engine, wherein the first engine module comprises the first RDMA Engine, and the server comprises the first server;
when the RDMA instruction also comprises a second instruction which is an instruction after the first instruction, and the second instruction indicates to receive the second RDMA data of a second server, a threshold module of the first server determines whether the size of the first RDMA data currently sent exceeds the threshold set in the threshold modules, and determines whether the size of the second RDMA data to be received does not exceed the threshold;
in a case where the threshold module determines that the size of the first RDMA data exceeds the threshold and the size of the second RDMA data does not exceed the threshold, a control module of the first server does not control the network card to create a new thread, the first RDMA Engine receives the second RDMA data after completion of the sending of the first RDMA data, and the first RDMA Engine maps the second RDMA data into the memory of the first server;
in a case where the threshold module determines that the size of the first RDMA data exceeds the threshold, and determines that the size of the second RDMA data to be received also exceeds the threshold, the threshold module notifies the control module, the control module controls the network card to create a RDMA Engine, and the new RDMA Engine receives the second RDMA data, and maps the second RDMA data into the memory of the first server.

4. The method according to claim 3, wherein the size determining comprises: when the size of the first RDMA data and/or the size of the second RDMA data are/is not greater than the storage space capacity of the engine module, sending or receiving, by the engine module, the second RDMA data in sequence.

5. One or more non-transitory computer-readable storage media storing computer-readable instructions, the computer-readable instructions, when executed by the one or more processors, enabling the one or more processors to perform following operations:

address presetting: presetting address information corresponding to a Remote Direct Memory Access (RDMA) instruction according to the RDMA instruction in a server:
data mapping: mapping, by a memory of the server, RDMA data corresponding to the RDMA instruction to an engine module in a network card of the server according to the RDMA instruction:
size determining: when a size of first RDMA data currently sent or received by the engine module and a size of second RDMA data to be sent or received by the engine module are both greater than a storage space capacity of the engine module, sending a thread increasing instruction to the network card; and
thread increasing: increasing, by the network card, a number of threads of the engine module:
wherein the thread increasing comprises: sending or receiving, by the increased thread of the engine module, the second RDMA data, and when the engine module receives the second RDMA data, mapping, by the engine module, the second RDMA data to the memory of the server:
wherein when the RDMA instruction comprises a first instruction which is a write instruction,
  a write function module of a first server maps the first RDMA data from a memory of the first server into a first RDMA Engine, wherein the first engine module comprises the first RDMA Engine, and the server comprises the first server;
  when the RDMA instruction also comprises a second instruction which is an instruction after the first instruction, and the second instruction indicates to receive the second RDMA data of a second server, a threshold module of the first server determines whether the size of the first RDMA data currently sent exceeds the threshold set in the threshold modules, and determines whether the size of the second RDMA data to be received does not exceed the threshold;
  in a case where the threshold module determines that the size of the first RDMA data exceeds the threshold and the size of the second RDMA data does not exceed the threshold, a control module of the first server does not control the network card to create a new thread, the first RDMA Engine receives the second RDMA data after completion of the sending of the first RDMA data, and the first RDMA Engine maps the second RDMA data into the memory of the first server;
  in a case where the threshold module determines that the size of the first RDMA data exceeds the threshold, and determines that the size of the second RDMA data to be received also exceeds the threshold, the threshold module notifies the control module, the control module controls the network card to create a RDMA Engine, and the new RDMA Engine receives the second RDMA data, and maps the second RDMA data into the memory of the first server.

6. The system according to claim 1, wherein
the control module receives the thread increasing instruction and sends enabling information to the network card of the first server, and the network card increases the number of threads of the first engine module according to the enabling information and sends or receives the second RDMA data.

7. The system according to claim 1, wherein address information corresponding to the RDMA instruction is written in the API module, so that the RDMA data corresponding to the RDMA instruction carries the address information in the API module.

8. The system according to claim 2, wherein the system further comprises a read function module,
  when a user sends an RDMA instruction and RDMA data, the read function module and the write function module parse the RDMA instruction carrying a corresponding address in the API module and send the RDMA instruction to the second server.

9. The system according to claim 8, wherein when the write function module parses the write instruction, the write function module acquires the first RDMA data to be written into the second server; the threshold module checks whether the second RDMA data carried by a next instruction of the instruction corresponding to the first RDMA data exceeds the threshold of a RDMA engine.

10. The system according to claim 9, wherein when the threshold module determines that a size of the second RDMA data is greater than the threshold set in the threshold module, the control module controls the network card of the first server to create a new thread, an RDMA engine of the new thread receives the next instruction and executes a command of the next instruction; the API module carries an address of the second RDMA data to the RDMA engine of the new thread, and the RDMA engine corresponding to the first RDMA data and the RDMA engine of the new thread concurrently send the first RDMA data and the second RDMA data respectively.

11. The system according to claim 9, wherein when the threshold module determines that a size of the second RDMA data does not exceed the threshold set in the threshold module, the control module does not control the network card of the first server to create a new thread, and the RDMA engine sequentially sends or receives the first RDMA data and the second RDMA data.

12. The system according to claim 2, wherein when the RDMA instruction of the first server indicates to receive RDMA data of the second server, the threshold module determines whether a size of first RDMA data currently sent exceeds the threshold set in the threshold module and whether a size of second RDMA data to be received exceeds the threshold set in the threshold module.

13. The system according to claim 12, wherein when the size of the first RDMA data currently sent exceeds the threshold set in the threshold module and the size of the second RDMA data to be received does not exceed the threshold set in the threshold module, the control module does not control the network card to create a new thread, a RDMA engine of the network card of the first server receives the second RDMA data after the RDMA engine of the network card of the first server completes sending the first RDMA data, and the RDMA engine of the network card of the first server maps the second RDMA data into the memory of the first server.

14. The system according to claim 12, wherein when the threshold module determines that the size of the first RDMA data exceeds the threshold set in the threshold module, and determines that the size of the second RDMA data to be received also exceeds the threshold set in the threshold module, the threshold module notifies the control module, the control module controls the network card to create a new RDMA engine, and the new RDMA engine receives the second RDMA data, and maps the second RDMA data from a RDMA engine into the memory of the first server.

15. The system according to claim 12, wherein when the size of the first RDMA data currently sent does not exceed the threshold set in the threshold module and the size of the second RDMA data to be received exceeds the threshold set in the threshold module, the control module does not control the network card to create a new thread, a RDMA engine of the network card of the first server receives the second RDMA data after the RDMA engine of the network card of the first server completes processing the first RDMA data.

16. The method according to claim 3, wherein the size determining further comprises:
 identifying a storage space capacity of the engine module and establishing the threshold based on the storage space capacity of the engine module.

\* \* \* \* \*